June 24, 1930.   H. G. ALTVATER   1,767,909
MULTIPLE SPEED TRANSMISSION MECHANISM
Original Filed Nov. 2, 1923    4 Sheets-Sheet 1
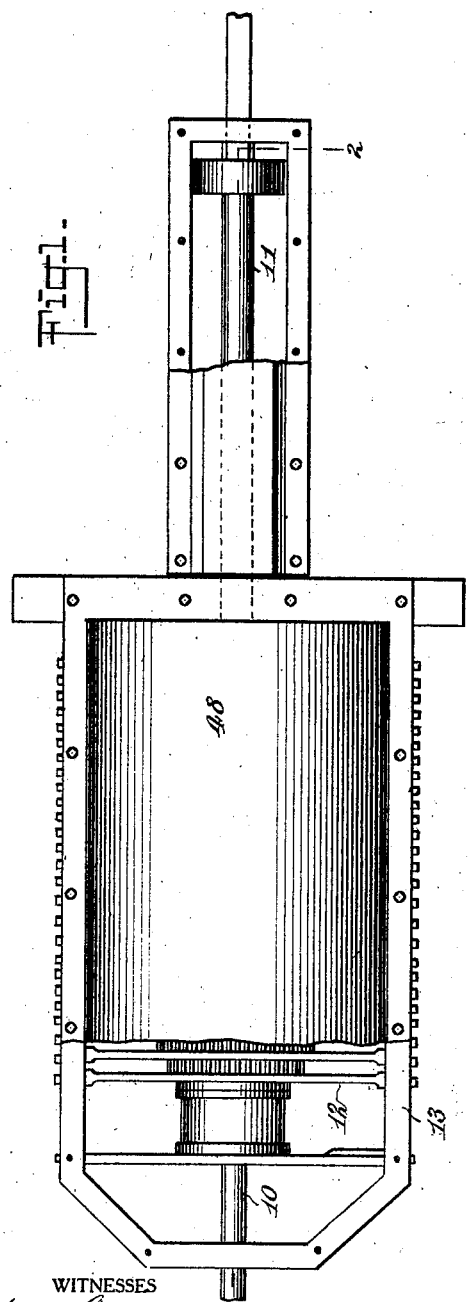
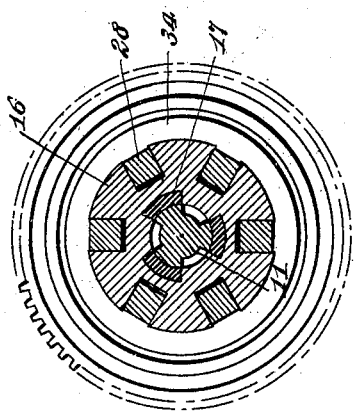
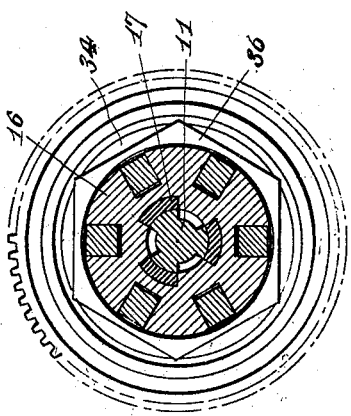
INVENTOR
Herbert G. Altvater
BY
ATTORNEYS

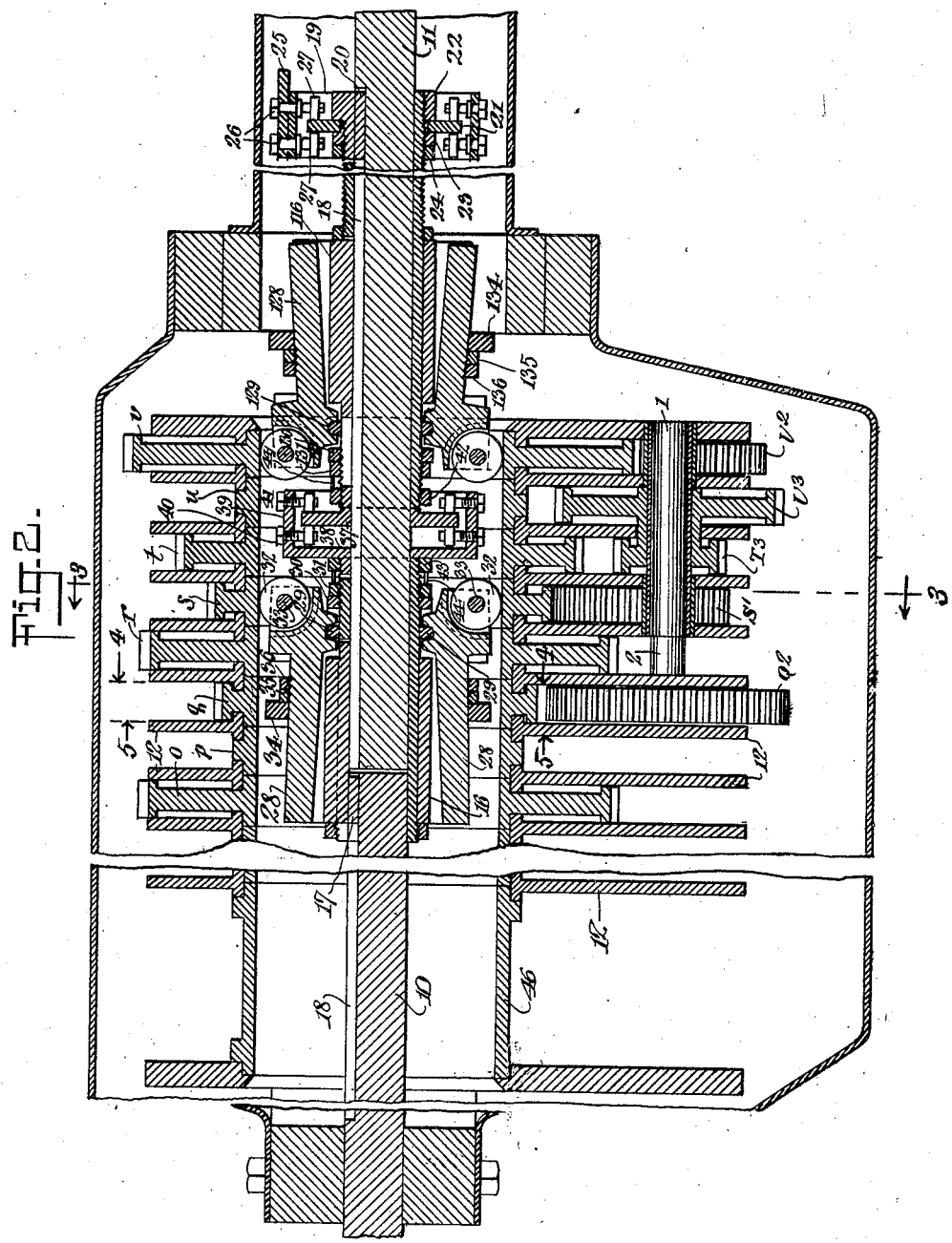

June 24, 1930.  H. G. ALTVATER  1,767,909
MULTIPLE SPEED TRANSMISSION MECHANISM
Original Filed Nov. 2, 1923    4 Sheets-Sheet 3
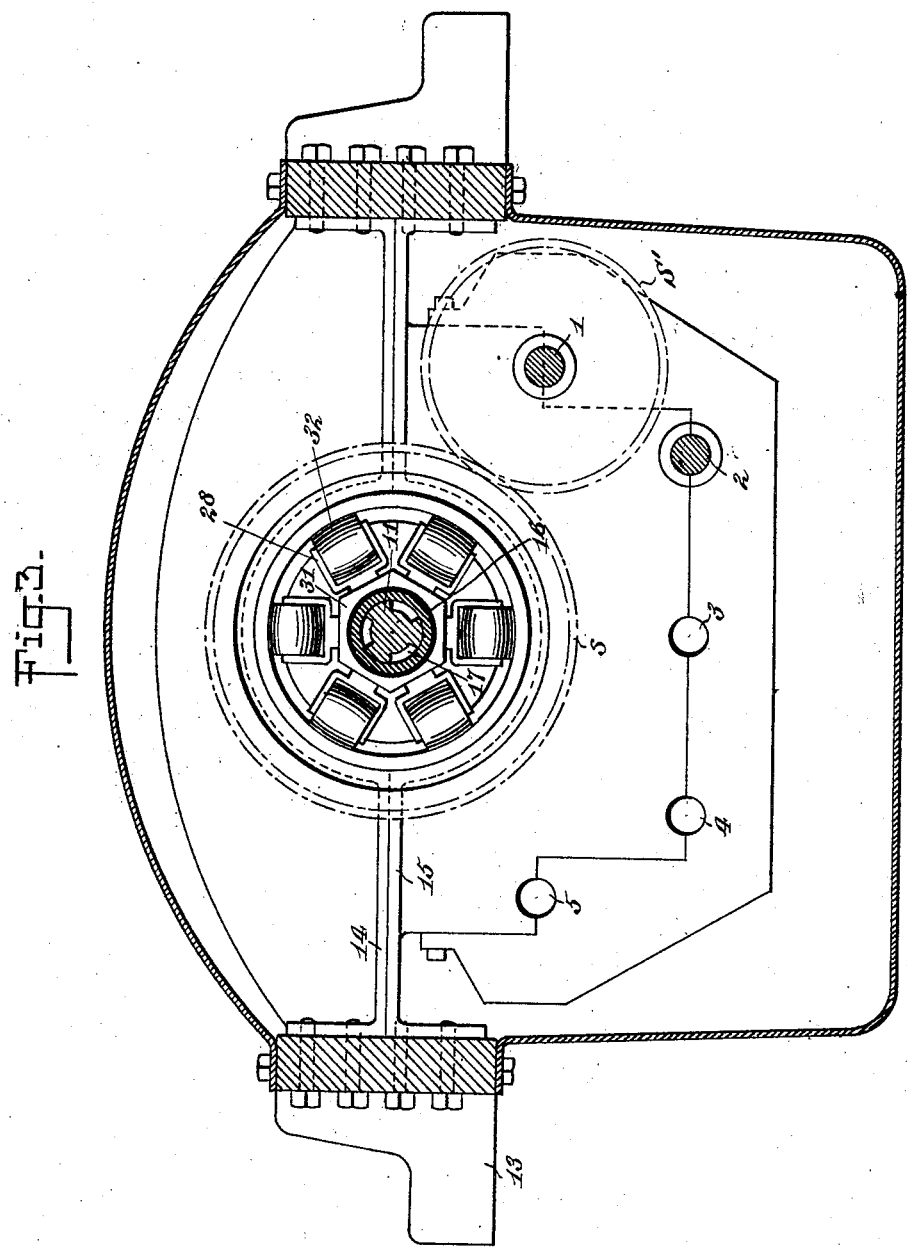
WITNESSES
INVENTOR
Herbert G. Altvater
BY
ATTORNEYS

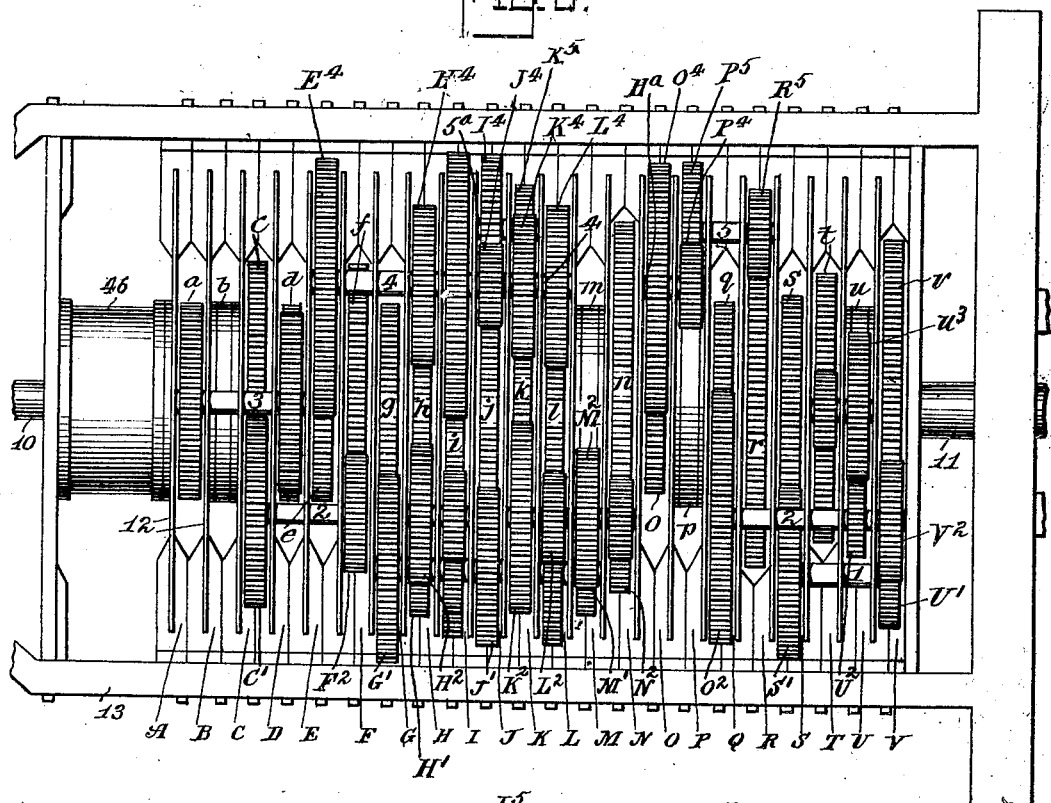

Patented June 24, 1930

1,767,909

UNITED STATES PATENT OFFICE

HERBERT GEORGE ALTVATER, OF GARY, INDIANA

MULTIPLE-SPEED TRANSMISSION MECHANISM

Original application filed November 2, 1923, Serial No. 672,436. Divided and this application filed November 20, 1926. Serial No. 149,696.

The present application is a division of United States application filed by me November 2, 1923, Serial Number 672,436, which matured into Patent Number 1,616,342, which prior application, in common with the present application relates to a multiple speed transmission gearing and particularly to a gearing in which conjugate couples of drive and driven elements are established alternately with non-conjugate adjustments in such a manner that a shift from one conjugate couple to another conjugate couple for turning the driven shaft at a given speed is alternate with an intermediate adjustment to a non-conjugate relation of the drive and driven elements, whereby a drive element may be continuously rotated with the drive shaft while the driven element may or may not actuate the coaxial driven shaft according to the conjugate or non-conjugate relation of the drive and driven elements established by the intermediate gears and a shiftable clutch assemblage.

Particularly the present application relates to clutch means for the gearing elements including a shiftable carrier composed of sections which are sleeved on the drive and driven shafts.

The nature of the present invention and its distinguishing features and advantages will clearly appear from the following description and the claims.

Reference is to be had to the accompanying drawings forming a part of this specification, it being understood that the drawings are merely illustrative of one example of the invention.

Figure 1 is a plan view of a variable transmission mechanism embodying my present invention;

Figure 2 is a longitudinal vertical section as indicated by the line 2—2, Figure 1;

Figures 3, 4 and 5 are transverse vertical sections taken respectively in planes indicated by the lines 3—3, 4—4 and 5—5, Figure 2;

Figure 6 is an inverted plan view of the gearing;

Figure 7 is a schematic view of the intermediate gearing assemblage.

The following described gearing assemblage is comprised in the invention of my aforenamed application: In the illustrated example of my invention the numeral 10 may be taken as indicating a drive shaft, and 11 a driven shaft in axial alinement therewith. Drive elements are associated with the driven shaft and actuated through the medium of an intervening optionally shiftable drive connection which drive connection serves also to establish connection between the selected drive element associated with the drive shaft and the selected driven element serving to turn the driven shaft. The numerals 14 and 15 indicate respectively the parallel upper and lower bearing or gear spacing members or journals which support the drive and driven elements. Members 14 and 15 are supported by frame member 13. The lower side of member 15 has five journals to support short shafts where required as indicated by shafts 1, 2, Figure 3, and hereinafter referred to. The numeral 12 indicates a member with half journals for holding shafts 1 to 5 where required.

It will be useful here to briefly refer generally to the drive and driven elements, here shown as gears, as well as to a shiftable clutch associated with said drive and driven elements and to an intermediate gear train. Thus, coaxial with the drive shaft 10 and driven shaft 11 are a series of elements adapted to constitute drive and driven elements and filler or spacing elements forming parts of an interior cylindrical surface with the drive and driven elements. A slidable clutch device is shiftable along the drive and driven shaft and turnable therewith and disposed within the drive and driven elements and filler elements, and has means as explained in detail hereinafter, to engage an element to be turned with the drive shaft as well as means to engage a second element to be driven for turning the driven shaft or for idling. A train of intermediate gears is provided, so that one of the elements coaxial with the drive and driven shafts, will be driven from the drive shaft by the action of the clutch, and the element thus driven will, through the intermediate train of gearing, cause a second clutched one of said elements coaxial with the drive and driven shafts to be driven for turning the driven shaft.

At the left end of Figures 2 and 4 is shown a direct drive element 46 which is mounted adjacent to the annular gear elements. Its axis is concentric with the axis of the drive and driven elements; it has the same internal cylindrical diameter as the drive and driven elements and is mounted similarly to them; and it has a length sufficient to enable it to be grasped simultaneously by both the slidable clutch device attached to the drive shaft and the slidable clutch device attached to the driven shaft. This direct drive element 46 thus constitutes a rigid connection or splice between the driving shaft and the driven shaft whereby when desired they can be made to rotate together as a single unit at the same rate of speed.

For the convenience of description I will designate the drive and driven gear elements and the interposed filler elements by letters in the order in which said elements are arranged. Thus, from left to right, referring to Figure 6, the spaces between the bearing members 12 are designated by the capital letters A to V. Certain non-driving elements are employed in my novel assemblage, and so coordinated with the drive and driven elements of the assemblage that compactness results while making provision for a large number of gear shifts—22 in the illustrated example as will appear. The non-driving elements functioning purely as spacing or filler elements in association with the novel arrangement of drive and driven gear elements are lettered $b$, $m$, $p$ and $u$ and they form with the drive and driven elements a series of elements bearing the consecutive letters $a$ to $v$ reading from left to right, Figure 6. The spaces lettered A to V receive the drive and driven gear elements and the filler elements, all coaxial with the drive shaft 10 and driven shaft 11. The intermediate train of gears is mostly made up of conjugate couples mounted on short shafts designated 1, 2, 3, 4 and 5. In the diagram, of the intermediate gearing, Figure 7, I have designated the axes of the various groups of the intermediate gears by the numerals 1 to 5 because corresponding with and representing the short shafts 1, 2, 3, 4, 5. In Figure 7, which gives a schematic view of the intermediate gearing in the interest of clearness, the axes are designated in the order 1 to 5. Those shafts along the axis 1, I have designated as 1, $1^a$, $1^b$ and $1^c$; those shafts disposed along the axis 2, I have designated as 2, $2^a$, $2^b$, $2^c$ and $2^d$; those shafts along the axis 3, I have designated as 3 and $3^a$; those shafts along the axis 4, I have designated as 4, $4^a$, $4^b$ and $4^c$; and those shafts along the axis 5, I have designated 5 and $5^a$. All of said shafts turn in the gear spacing bearing members 12. The intermediate gears turning about the axes 1, 2, 3, 4, 5, are in planes corresponding with the spaces A to V between the bearing members 12. Said spaces between the bearing members 12 being thus designated respectively by the capital letters A to V in Figure 6, those elements in the intermediate gearing in the diagram, Figure 7, in positions corresponding with said spaces, have been designated by corresponding capital letters A to V but with exponents identifying the axes about which the different elements of the intermediate gearing turn, that is to say, (reading from left to right of Figure 7) by the characters $A^3$, $C'$, $D^3$, $E^4$, etc. In the intermediate gearing assemblage is at least one element in the spaces A to V except the space B. The elements of the intermediate gear ($A^3$, $C'$, $E^4$, etc.) are in the spaces A to V and therefore in the planes of the elements $a$ to $v$. Said intermediate gear elements forming the conjugate or non-conjugate couples are spaced varying distances according to the situations in the assemblage to make for compactness while attaining the maximum number of gear shafts for the given number of gears and in a given total space. From Figure 7 it will be noted therefore that there is not a uniformity in the length of those shafts of the intermediate gear along the axes 1, 2, 3, 4, 5. For example, four shafts along axes 1, 2, 3, 4 and numbered 1, 2, 3, 4 are of the same length. The shaft adjacent the axis 1, that is, shown near the lower right-hand corner of Figure 7, and numbered $2^a$ is longer while at other parts of the intermediate gear the shafts such as $1^a$, $1^b$, $1^c$, $2^b$, $2^c$, $2^d$, are simply of a length to pass through one of the bearing elements 12. The thickened lines in the diagram, Figure 7, along the respective axes 1, 2, 3, 4, 5, represent the positions of the short shafts, numbered 1, 2, 3, 4, 5 in Figure 6, which shafts connect certain elements of the intermediate gearing in couples.

I will now describe the shiftable carrier and coupler assemblage constituting the present invention: A shiftable carrier (16, 116) composed of sections, is sleeved on the shafts 10, 11 to have longitudinal movement and has a key 17 movable in registering grooves 18 in the drive shaft 10, so that the carrier will rotate with the drive shaft but may be shifted longitudinally along the shafts. The carrier will be hereinafter generally referred to as 16, one of the sections being designated 116 in the interest of clearness; to wit, that section concentric with the driven shaft 11. A control assemblage 19 is slidably mounted on the driven shaft 11 and has a key 20 slidable in the groove 18 of said shaft. On the slide 19 is a flat ring or disk 21 lying against a collar 22 on said slide and held by a nut 23 and lock nut 24. A shift rod 25 is connected with the slide 19 to be optionally operated for moving said slide longitudinally, said rod being shown secured by bolts 26 to the slide and the bolts having pairs of rollers 27 between which the ring 21 is disposed so that the shifting of the rod 25 longitudinally will, through the medium of the bolts 26, rollers 27 and ring 21 carry the slide 19 along the driven shaft 11. On the carrier 16 I provide a lever or levers 28 disposed longitudinally with the axes of the shafts and fulcrumed on a ring 29. Said levers 28 are held against displacement by a nut 30 and lock nut 31 on the carrier 16 which thus serves to carry the levers. Each lever 28 mounts a roller 32 turning on pin 33, said pin being transverse to the axis of the shafts 10, 11, so that the several rollers 32 thus turn about transverse axes. Use is made of the rollers 32 as an example of means to selectively effect driving engagement with one of the elements $a$, $b$, $c$, etc. The rollers 32 have clutching or holding and driving contact with whichever of the elements $a$, $b$, $c$, etc. that is engaged by said rollers 32. To rock the levers 28 on their fulcrum ring 29 and so adjust the levers as to maintain driving engagement with an element, $a$, $b$, $c$, etc., I provide a ring 34 embracing the levers and slidable along the same. Said ring 34 is held in adjusted position by a nut 35 and lock nut 36. Thus, the turning of the drive shaft 10 will cause the turning of the carrier 16 and the levers 28, and by reason of the engagement of the rollers 32 with a particular element $a$, $b$, $c$, etc., will cause said selected element to be driven with the drive shaft 10.

I provide a second lever or a set of levers 128 carrying rollers or equivalent clutch means 132 to effect operative engagement with a second one of the elements $a$, $b$, $c$, etc. The levers 128 are shown fulcrumed on a ring 129 and held against displacement by a ring nut 130 and a lock nut 131. To rock the levers 128 and adjust the same to maintain engagement of the rollers 132 with the selected element $c$, $d$, etc., a slide ring 134 embraces said levers and is held in place by a ring nut 135 and lock nut 136.

A coupler assemblage is provided between the sections of the carrier 16. On the one section 116 is a radial flange 37 and a coupler disk 38 is secured to or formed upon the other section of the carrier 16 and terminates in an annular flange 39 concentric with the axis of the drive and driven shafts 10, 11. The flange 39 has a series of radial bolts 40 carrying rollers 41 at opposite sides of the flange 37. Thus, a longitudinal movement of the carrier section 116 in response to the movement of the shift rod 25 will through the flange 37, rollers 41, bolts 40, flange 39, and disk 38, cause a corresponding longitudinal movement of the other section of the carrier 16, whereby the levers 28 and 128 will be carried longitudinally to shift the engagement of the rollers 32 and 132 to selectively engage particular gears $a$, $b$, $c$, etc. The ring nuts 42, 43 are provided on the sections of the carrier 16, to position the described coupler between the carrier sections. Also, spring locking rings 44 are provided adjacent the rings 42, 43, between the same and the lock nuts 31 and 131.

The description of the gear shifts to effect various combinations of gearing for different speeds, is fully explained in my aforenamed application and need not be further referred to here.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a transmission gearing, a drive shaft, a driven shaft, an element adapted to constitute a direct-drive element, shiftable means to control the drive connection between the drive shaft and said direct-drive element, and shiftable means to control the drive connection between the said direct-drive element and the driven shaft, said shiftable means having rollers mounted on axes transverse to the drive shaft and said rollers engageable by frictional bearing resistance with the peripheral surfaces of the said direct-drive element.

2. In a clutch and power control mechanism, a drive shaft, a shiftable carriage mounted on said drive shaft and rotatable with it, levers mounted upon said shiftable carriage, and transverse rollers affixed onto said levers adapted to engage suitable driven elements by frictional bearing resistance and said levers occupying positions approximately parallel to and about said driving axle, and a ring of metal enclosing the ends of said levers which are opposite to the transverse rollers, which ring of metal exerts a constant pressure on the said levers.

3. In a clutch and power control mechanism, a drive shaft, a shiftable carriage mounted on said drive shaft and rotatable with it, a series of levers of the first class, driven elements, said levers mounted upon said shiftable carriage, transverse rollers affixed to said levers and adapted to engage the driven elements by frictional bearing resistance, and said levers occupying positions approximately parallel to and about said driving shaft, a ring of metal enclosing the ends of said levers which are opposite to the transverse rollers which ring of metal exerts a constant pressure on said levers, and the application of the lever principle to the said transverse rollers whereby the radial pressure on the transverse rollers is increased in the same ratio as the length of the lever arm from the fulcrum to the enclosing ring bears to the length of the lever arm from the fulcrum to the transverse rollers.

4. In a clutch and power control mechanism for the engagement and disengagement of rotative power, a drive shaft, a shiftable carriage mounted on said drive shaft and rotatable with it, a drive element, transverse rollers, levers on said shiftable carriage, said levers affixed in position radially, an adjustable ring and a lock nut therefor, whereby said rollers are uninterruptedly held with a constant pressure an invariable fixed distance from the axis of rotation of the shaft.

5. In a clutch and power control mechanism for the engagement and disengagement of rotative power, a drive shaft, a shiftable carriage mounted on said drive shaft and rotatable with it, levers on said drive shaft, transverse rollers mounted on said levers, a series of drive elements of practically constant interior diameters arranged contiguous to each other to provide uninterrupted frictional line engagement between each transverse roller and each element in succession as the shiftable carriage is moved through the elements.

HERBERT GEORGE ALTVATER.